United States Patent

Graham et al.

[11] 3,983,899
[45] Oct. 5, 1976

[54] CHECK VALVE

[76] Inventors: Gerald A. Graham, 9730 Derrik, Houston, Tex. 77055; Harold R. Graham, 12921 Trail Hollow, Houston, Tex. 77024

[22] Filed: Aug. 4, 1975

[21] Appl. No.: 601,903

[52] U.S. Cl. ................................ 137/495; 137/543
[51] Int. Cl.² ........................................ F16K 15/06
[58] Field of Search ........ 137/495, 469, 461, 487.5, 137/543, 543.13, 543.15, 383, 384.2, 384.4, 384.6, 384.8

[56] References Cited
UNITED STATES PATENTS

| 455,001 | 6/1891 | Lonergan | 137/543.13 |
| 1,322,076 | 11/1919 | Wheaton | 137/383 X |
| 1,372,063 | 3/1921 | Carruth | 137/383 X |
| 1,380,586 | 6/1921 | Pelletier | 137/543.13 X |
| 1,568,940 | 1/1926 | Dooley | 137/543 |
| 2,301,378 | 11/1942 | Crista | 137/383 X |

*Primary Examiner*—Martin P. Schwadron
*Assistant Examiner*—Robert J. Miller
*Attorney, Agent, or Firm*—Fulbright & Jaworski

[57] ABSTRACT

A check valve having a body with an inlet and an outlet which are coaxially aligned and a valve element including a section of a sphere which is spring loaded urging the valve element towards and sealing against the inlet. The valve element is supported on a stem which is coaxially movable in the valve body. The body has a cavity of a cross-sectional area greater than the valve element by an amount at least as great as the area of the inlet whereby the valve avoids restricting the flow of fluid through the body. Locking means are provided for locking the valve element in the closed position.

3 Claims, 4 Drawing Figures

CHECK VALVE

BACKGROUND OF THE INVENTION

The present check valve, while useful for other applications, is particularly adapted for use on a fire engine pumper having a water reservoir in which the reservoir is filled from a water source such as a fire hydrant. The check valve is urged to a closed position by a spring thereby insuring that the inlet fluid pressure must be sufficient to overcome any hydrostatic pressure in the fire engine reservoir before the valve will open. The improved check valve of the present invention also includes an enlarged body cavity which insures that the flow passages through the valve, when the valve is opened, is sufficient to prevent any restriction in an area of the valve as the fluid flows therethrough. Furthermore, locking means are provided to lock the check valve in a closed position so that when the fire engine pumper dispenses water from the reservoir any vacuum pull on the reservoir will not cause the check valve to open.

SUMMARY

The present invention is directed to a check valve provided with a body having an inlet and an outlet which are coaxially aligned. The valve element is movably supported for coaxial movement towards and away from the inlet. The valve element is spring loaded for urging the valve element towards and sealing against the inlet whereby the check valve requires a predetermined fluid pressure at the inlet prior to opening.

Yet a still further object of the present invention is the provision of a spring-loaded check valve having locking means which may be actuated externally of the valve for locking the valve element in the closed position thereby allowing the valve to shut off fluid flow as well as act as a check valve.

Yet a still further object of the present invention is the provision of a check valve in which the body has a circular inlet and a circular outlet which are coaxially aligned and the valve element includes a section of a sphere which is mounted for coaxial movement with the inlet and outlet. The body has a cavity of a cross-sectional area greater than the cross-sectional area of the valve element by an amount at least as great as the area of the inlet whereby the valve avoid restricting flow of fluids therethrough.

Still a further object of the present invention is the provision of a fire engine pumper having a water reservoir and at least one valve connected to the reservoir in which the valve is a check valve having a valve element supported, for coaxial movement with the valve inlet and outlet, on a supporting stem in which the valve element is spring actuated to a closed position and locking means are provided for engaging the supporting stem for locking the valve element in the closed position with the locking means having an actuating lever extending externally of the body.

Other and further features and advantages will be readily apparent from the following description of a preferred embodiment.

DESCRIPTION OF THE PREFERRED EMBODIMENT

While the check valve of the present invention is useful for other applications, for purpose of illustration it will be described in conjunction with its use on a fire engine pumper having a water reservoir.

Figure 2:
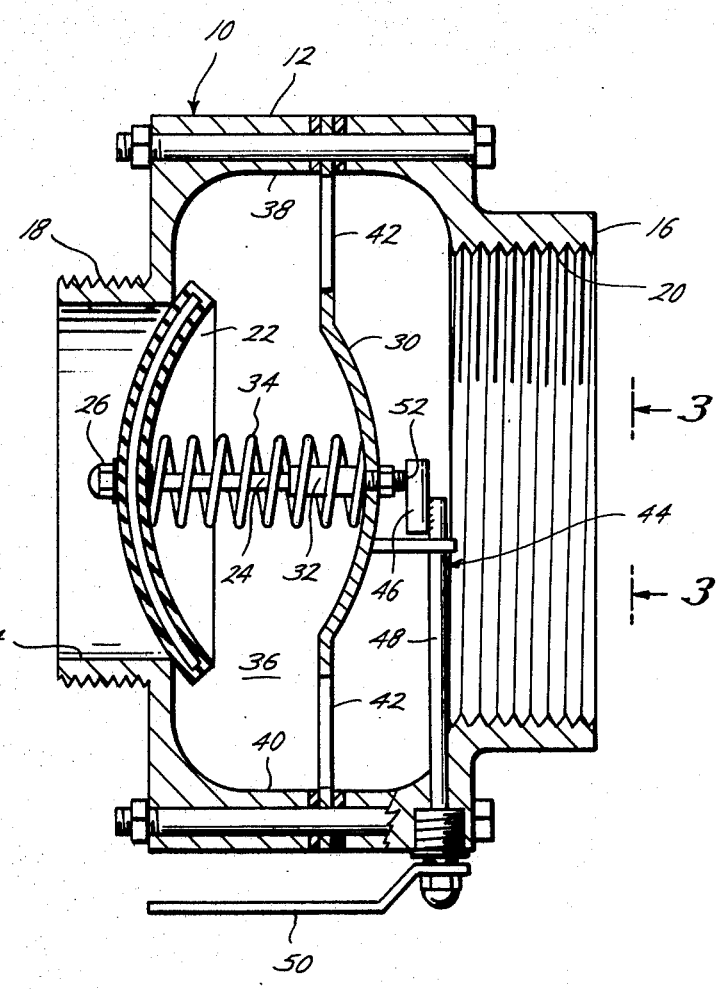
FIG. 2 is a cross-sectional elevational view of a preferred embodiment for the valve of the present invention.

Referring now to the drawings, and particularly FIG. 2, the reference numeral 10 generally indicates the apparatus of the present invention. The check valve 10 includes a body 12, a circular inlet 14 and a circular outlet 16. The inlet 14 and the outlet 16 are coaxially aligned and each includes connection means such as threads 18 and 20, respectively.

A valve element 22, preferably a portion of a sphere, is movably supported for coaxial movement with the inlet 14 and outlet 16 and is movable towards and away from the inlet 14. The valve element 22 is supported from a supporting stem 24, such as by a nut 26. The stem 24 is in turn movably supported for longitudinal movement along the axis of the valve 10 through a support member 30 which includes a tubular member 32. Spring means 34 is provided between the support member 30 and the valve element 22 for yieldably urging the valve element 22 towards and sealing against the inlet 14. Therefore, fluid entering the inlet 14 of the valve 10 must be under a sufficient pressure to overcome the force of the spring 34 in order to open the check valve element 22.

Since the valve element 22 moves axially in the body 12, the body 12 is provided with a cavity 36 defined by edges 38 and 40 providing a cross-sectional area greater than the cross-sectional area of the valve element 22 by an amount at least as great as the area of the inlet 14 for providing passage of the fluid through the valve 10 which avoids restricting flow of the fluids through the valve body 12. The support member 30, which may be circular, is provided with a sufficient number of openings 42 to avoid unduly restricting the flow of fluid through the valve 10.

Figure 3:
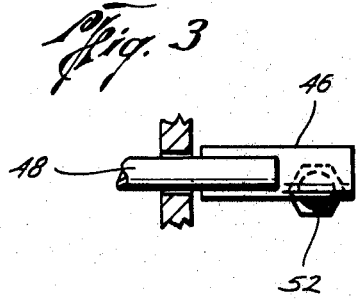
FIG. 3 is a cross-sectional view taken along the line 3—3 of FIG. 2 showing the locking mechanism in the locked position.
Figure 4:
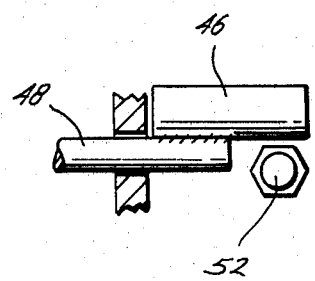
FIG. 4 is a view similar to FIG. 3 showing the locking mechanism in an unlocked position.

As best seen in FIGS. 2, 3 and 4, locking means, generally indicated by the reference numeral 44, is provided for locking the valve element 22 in the closed position as best seen in FIGS. 2 and 3. The locking means 44 may include a stop 46, preferably cylindrical, which is secured to a rotatable shaft 48 which extends through the body 12 of the valve 10 to suitable actuating means such as a lever 50. Rotation of the lever 50 will, in one direction, cam the stop 46 behind the end 52 of the valve stem 24, as best seen in FIGS. 2 and 3, holding the valve element 22 in the closed position. Movement of the lever 50, in the opposite direction, will rotate the shaft 48 and move the stop 46, as best seen in FIG. 4, out of the path of movement of the end 52 of the stem 24 allowing the check valve element 22 to be opened.

Figure 1:
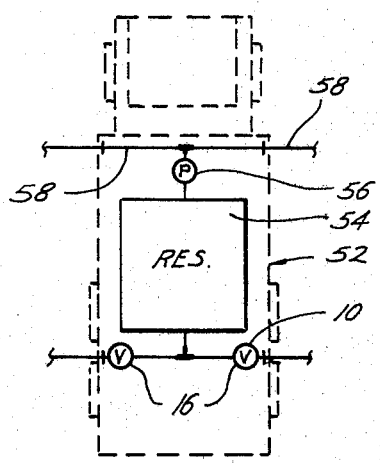
FIG. 1 is a schematic view illustrating the use of two valves of the present invention in conjunction with a fire engine pumper having a water reservoir.

Referring now to FIG. 1, a fire engine pumper, generally indicated by reference numeral 52 and shown in dotted outline, includes a water reservoir 54 and a pump 56 having outlets 58 all of which is conventional.

One or more of the valves 10 of the present invention is shown with the valve outlet 16 connected to the inlet of the water reservoir 54. If the valves 10 are placed in the unlocked position, the check valve element 22 will be urged by the spring 34 against the inlet 14 closing the valves 10 thereby preventing any loss of water from the reservoir 54. If a supply hose is connected to the threads 18 on the inlet 14 of the valve 10 and water under pressure is supplied therethrough, the water, when the pressure overcomes the spring 34, will open the check valve element 22 and flow through the reservoir 54. However, in the event that one or more of the supply hoses is disconnected from an inlet 14 of the valve 10 and the pump 56 of the pumper 52 is actuated, the locking mechanism in the valve 10 is actuated by moving the lever 50 to move the stop 46 against the end 52 of the stem 24 to lock the check valve 22 in the closed position on any valve which has been disconnected from a supply. Therefore, when the pump 56 in the pumper 52 is actuated, the valve element 22 will not be moved to the open position by the suction of the pump 56 to draw air into the water system of the pumper 52 which would interfere with its operation.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

What is claimed is:

1. A check valve comprising,
   a body having a circular inlet and a circular outlet which are coaxially aligned,
   a valve element including a section of a sphere,
   a valve element supporting stem mounted in the valve between the valve element and the outlet for coaxial movement and connected to and supporting the valve element,
   valve element supporting means connected to the body between the valve element and the outlet and supporting the movable supporting stem,
   spring means positioned between the valve element and the supporting means and about the supporting stem for yieldably urging the concave side of the valve element towards and sealing against the inlet in a closed position and opening upon the application of fluid pressure through the inlet,
   the body having a cavity of a cross-sectional area greater than the valve element by an amount at least as great as the area of the inlet, and said supporting means including openings outside of the path of movement of the valve element whereby the valve avoids restricting flow of fluids therethrough, and
   locking means including a stop for engaging the supporting stem for locking the valve element in the closed position, said locking means including actuating means connected to the stop and extending through one side of the body for manual actuation outside of the body.

2. The apparatus of claim 1 wherein the locking means includes,
   a rotatable shaft extending through the body,
   a stop secured to the side of the shaft, and
   a hand lever connected to the shaft externally of the body.

3. In combination with a fire engine pumper having a water reservoir and a pump connected to the reservoir of a valve comprising,
   a body having a circular inlet and a circular outlet which are coaxially aligned, the outlet being connected to the reservoir and the inlet adapted to be connected to a water supply,
   a valve element including a section of a sphere,
   a valve element supporting stem mounted in the valve between the valve element and the outlet for coaxial movement and connected to and supporting the valve element,
   valve element supporting means connected to the body between the valve element and the outlet and supporting the movable supporting stem,
   spring means positioned between the valve element and the supporting means and about the supporting stem for yieldably urging the concave side of the valve element towards and sealing against the inlet in a closed position and opening upon the application of fluid pressure through the inlet,
   the body having a cavity of a cross-sectional area greater than the valve element by an amount at least as great as the area of the inlet, and said supporting means including openings outside of the path of movement of the valve element whereby the valve avoids restricting flow of fluids therethrough, and
   locking means including a stop for engaging the supporting stem for locking the valve element in the closed position, said locking means including actuating means connected to the stop and extending through one side of the body for manual actuation outside of the body.

* * * * *